June 7, 1932.   W. BIRTEL   1,862,461
BORING AND TAPPING TOOL
Filed April 5, 1929   2 Sheets-Sheet 1
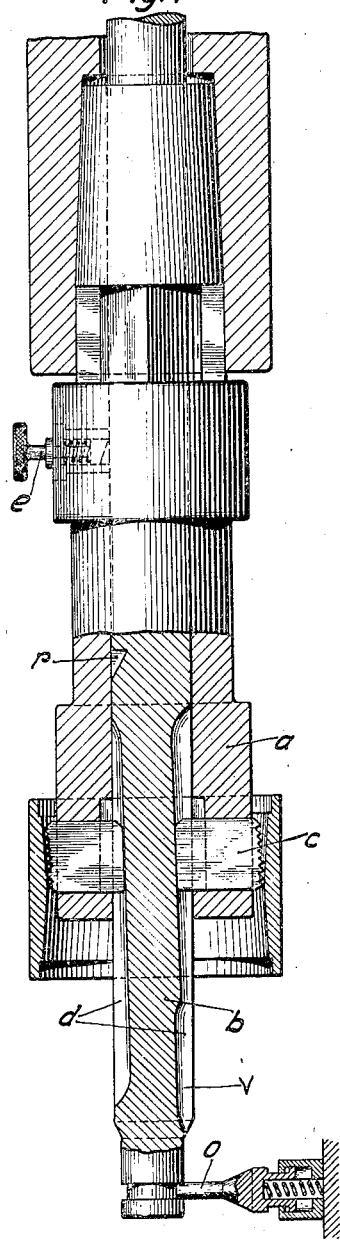
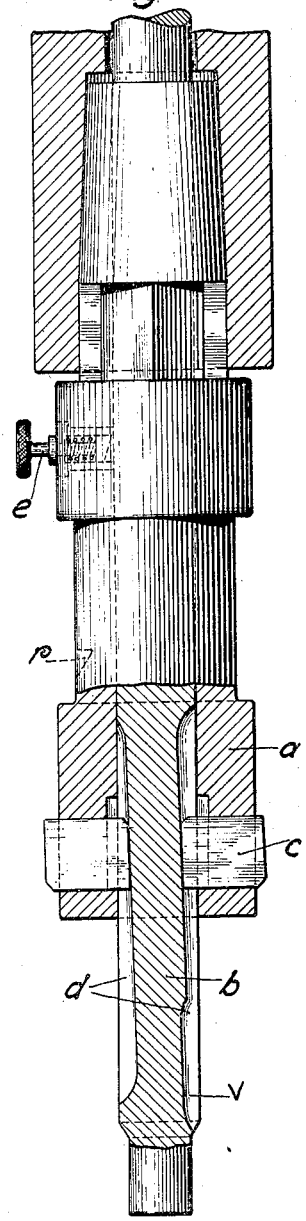
INVENTOR
WILHELM BIRTEL
by his attorneys
Howson and Howson

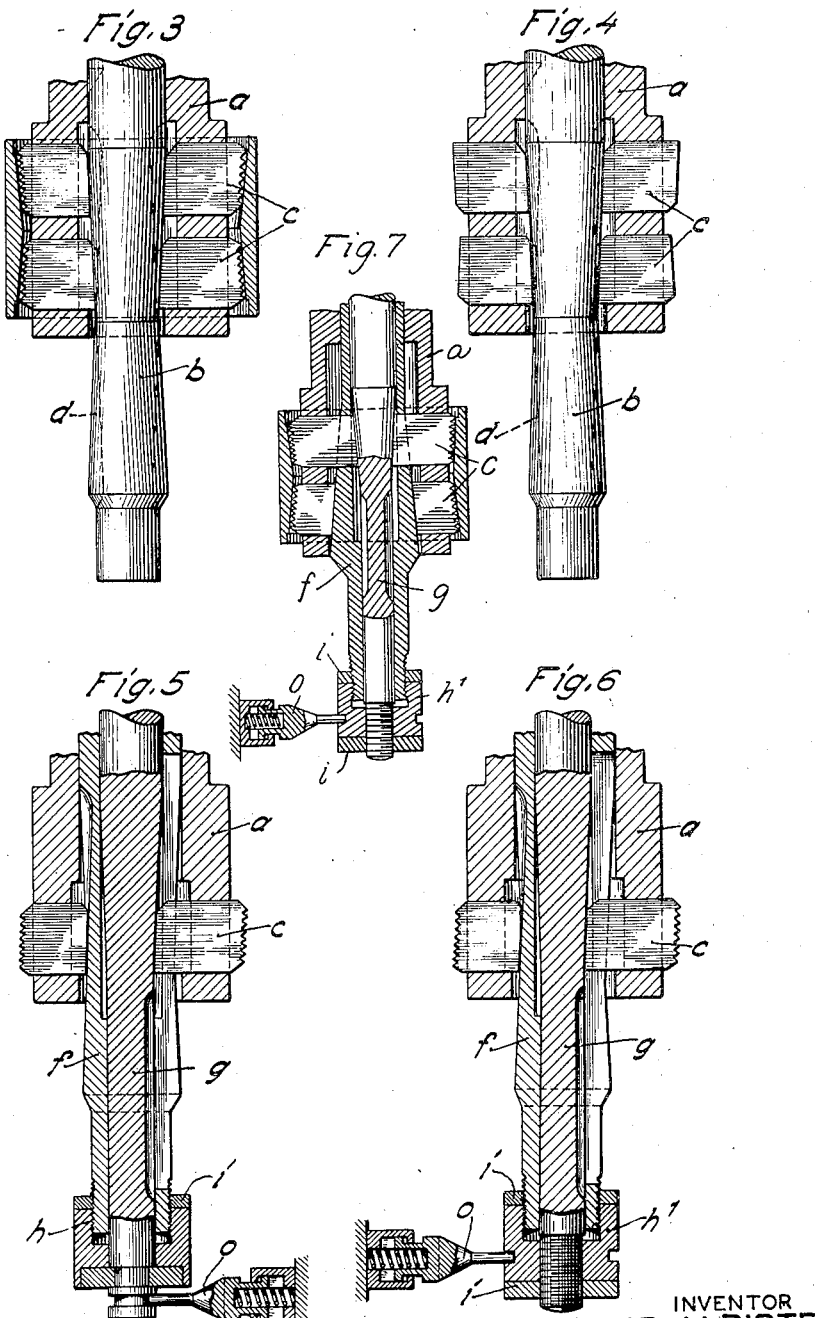

Patented June 7, 1932

1,862,461

UNITED STATES PATENT OFFICE

WILHELM BIRTEL, OF DUSSELDORF-RATH, GERMANY

BORING AND TAPPING TOOL

Application filed April 5, 1929, Serial No. 352,748, and in Germany April 24, 1928.

This invention relates to a boring and tapping tool for the manufacture of internally threaded sockets the screwed surfaces of which taper in two directions with respect to the axis of the socket and form truncated cones. Devices are already known in which a set of dies, having the dies arranged at the same level, produces the two taper threaded halves of a socket by the control of a double-cone-mandrel carried in a central hole in the dies.

Now, the object of this invention is to provide a new form of the controlling device arranged in the tool and a new arrangement and method of cutting of the dies. To this end, according to the invention, grooves are arranged in a cylindrical mandrel for the passage of the dies, two of said grooves being arranged diametrically opposite and parallel to one another and corresponding to the taper thread to be cut, and inclined relatively to the central axis of the tool, the control member preferably consisting of two parts namely, a shell and a mandrel carried therein, it thus being possible by an opposite movement of the two parts to vary the end diameters of the conical thread cut by the dies.

Further, according to the invention, one portion of the dies produces the first half and the other portion the second half of the socket, all the dies thus being able to be at the same level or two sets of dies arranged at different points along the axis of the mandrel may be employed.

In order that the invention may be fully understood, we will now describe it by reference to the accompanying drawings, in which:—

Figures 1 and 2 are sectional elevations of a tapping tool and a boring tool respectively, constructed according to the invention.

Figures 3 and 4 are similar views to Figures 1 and 2 of a modified form of both kinds of tool.

Figures 5 and 6 are sectional elevations of further modified forms, and

Figure 7 shows the use of two sets of dies arranged at different points along the axis of the mandrel in the form shown in Figure 6.

Referring to Figures 1 and 2 it will be noted that a die retainer $a$ holds near one of its ends thread cutting dies $c$ which fit in radially directed slots in the retainer in such a fashion as to prevent longitudinal or axial movement by them along the retainer, but permitting them to move transversely or radially in the retainer slots. If desired, more than two dies may be used as will hereinafter appear. The inner ends of the dies fit in grooves or channels $d$ in a mandrel $b$ which is carried centrally in the retainer $a$ and has one end projecting therefrom. The channels $d$ are inclined from the axis of the mandrel. As shown in Figures 1 and 2, one of the channels is inclined toward the axis and the other away from the axis in order that the die which moves in and is controlled by one of the channels will cut threads on one end of a socket while the die which moves in and is controlled by the other channel, will cut threads on the other end of the socket as the retainer $a$, and dies $c$ moving therewith, are advanced and rotated by power driven mechanism the socket being held still meanwhile as is sometimes done in the art. During this advance the mandrel is held against axial movement by a spring pressed securing pin $o$, fixedly located on a stationary part of the machine, the end of the pin taking into a peripheral groove in the projecting end of the mandrel to hold the mandrel as described. During the advancing or cutting movement just described the dies, which are pressed by springs against the mandrel, slide in the channels $d$.

Since the gradients of the channels on the mandrel are so arranged that some of the cutters or dies cut the upper half and the remaining cutters or dies cut the lower half of the socket, the threading of the socket is done from beginning to end in one stroke of the tool without the necessity of any further manipulation. It should be understood that the gradients must be shaped to correspond with the cone or taper of the socket, if such is desired.

When the socket has been bored or the thread cut a spring pressed stop $e$ located on the retainer $a$, drops into a notch $r$ in the mandrel $b$ and the stop pin $o$ is withdrawn to permit the whole tapping or boring mechanism to be brought back through the socket without it being necessary to take the heavy tool from the machine shaft. In order that the die or dies which cut the lower threads (see Figures 1 and 2) may not engage those threads when the tool is being withdrawn, valleys $v$ are made in the bottom of the channels which control said dies. These valleys allow the die or dies to move radially inward enough so that they will clear the socket when the tool is withdrawn as described.

After the socket under treatment has been removed and a new socket put in position the inner mandrel $b$ is brought to its original position and is secured by the stop pin $o$.

Figures 3 and 4 show a modified form in which there are sets of dies used to cut the threads or do the boring of each portion of the socket. The dies may be located directly above each other or not, as desired. The method of operating these dies is the same as in the case of Figures 1 and 2, the only difference being that several dies can cut simultaneously in this second form and thus considerable time is saved.

In order to avoid the necessity of producing the cutting edges accurately for the material in question and in order to effect the variation of the end diameter of the cone, in the third form, according to Figures 5, 6 and 7 the controlling member is divided into two parts, namely a shell $f$ and a mandrel $g$ carried therein, which are displaceable relatively to one another and to the die holder $a$.

The arrangement of the dies is carried out either according to Figures 5 and 6, in that, of two opposing dies, one slides on the conical shell and the other on the conical mandrel so that their cutting edges are moved parallel to one another, or according to Figure 7 wherein a set of boring or cutting dies which produce the one half of the socket slides on the shell $f$ and the other on the mandrel $g$. In the form shown in Figure 5, the arrangement can also, in contradistinction to the drawings, be such that the lower dies slide on the mandrel $g$ and the upper dies on the shell $f$. Referring to Figure 5, it will be noted that the end of shell $f$ is screw threaded to cooperate with a nut $h$ which may be locked by a locking nut $i'$. The nut $h$ is rotatably secured on the end of mandrel $g$ so that as the nut is rotated the shell $f$ is moved along the mandrel and thereby the cutter which engages the shell is moved in (if the shell is moved down) or out (if the shell is moved up). During the adjustment just described, the mandrel, and the cutter which engages the mandrel, are maintained stationary by a securing or stop pin $o$ like that hereinbefore described. In order to move the mandrel engaging cutter in or out the same distance as the shell engaging cutter, the location of the stop pin $o$ must be moved. This may be done by any suitable means.

In operation of the form shown in Figure 5, suppose that it is desired to move the cutters out, in order that a larger thread or bore may be cut. First the lock nut is loosened then the nut $h$ is turned to move the shell $f$ up for instance 10 mm. This moves the shell engaging cutter out a certain distance. Then the pin $o$ and the mandrel and nut $h$ and shell $f$ are moved down 5 mm. as a unit. This movement moves the mandrel engaging cutter out only one half the distance that the shell engaging cutter was moved, but at the same time it moves the shell engaging cutter in a corresponding distance (one half the distance it was formerly moved out). Thus in the aggregate both dies have been moved out an equal distance.

In Figure 6 another form of cutter adjusting means is shown. In this form the nut $h'$ is held stationary by a stop pin $o$ like that hereinbefore described. In this form the nut $h'$ has screw threaded engagement with the shell $f$ as in Figure 5, but it also has screw threaded engagement with the end of mandrel $g$ the threads on the mandrel having the same pitch of the threads on the shell. Also the threads on the mandrel and shell are turned in opposite directions—that is they are right hand and left hand threads respectively or vice versa,—so that as the shell is moved down 5 mm. the mandrel is at the same time moved up 5 mm. and hence in the aggregate each cutter is moved in the same distance in like manner as hereinbefore described. To move the cutters out the nut $h'$ is turned in the opposite direction from that in which it was turned to move the cutters in. The adjustment is made permanent by locking nuts $i'$ in a conventional manner.

Figure 7 shows the same adjusting means as Figure 6 but in Figure 7, a set of dies are shown whereas in Figure 6, only one die for each portion of the socket is shown.

The method of cutting, in the constructions shown in Figs. 5, 6, 7, is the same in principle as in Figs. 1, 2, 3, and 4. In each case the movement of the dies along surfaces inclined to the axis of the mandrel makes possible the cutting of a tapered thread. The constructions in Figs. 5, 6 and 7 however have the advantage that they are provided with means whereby the diameter of the cut at the mouth of the socket can be easily adjusted to the proper size.

I claim:

1. In a device adapted to cut internal surfaces in a socket or the like, cutting dies, a retaining device for said dies, a sleeve device within said retaining device, said sleeve device having an inclined surface, a mandrel within said sleeve device, said mandrel having an inclined surface, said dies engaging said inclined surfaces and moving along them during the cutting, and said dies being radially moved upon relative axial movement of said retaining device and said sleeve device and mandrel.

2. In a device adapted to cut internal surfaces in a socket or the like, cutting dies, a retaining device holding said dies, a sleeve device within said retaining device and a mandrel within said sleeve device, oppositely inclined surfaces on said sleeve device and mandrel, said dies engaging in said surfaces and moving along them during cutting, said dies being moved radially upon relative axial movement between said retaining device and said sleeve device and mandrel, and a fixedly located nut having screw thread engagement with said sleeve device and mandrel whereby said mandrel and sleeve device may be moved axially in relation to each other and to said retaining device to adjust the radial position of said dies.

3. In a device adapted to cut internal surfaces in a socket or the like, cutting dies, a retaining device holding said dies, a sleeve device within said retaining device and a mandrel within said sleeve device, oppositely inclined surfaces on said sleeve device and mandrel, said dies engaging in said surfaces and moving along them during cutting, said dies being moved radially upon relative axial movement between said retaining device and said sleeve device and mandrel, a rotatable nut having screw threaded engagement with said sleeve device and engaging said sleeve device and mandrel, whereby said sleeve device and mandrel may be moved axially in relation to said retaining device to adjust the radial position of said dies.

4. In a device adapted to cut internal surfaces in a socket or the like, cutting dies, a retaining device for said dies, a sleeve device within said retaining device, said sleeve device having an inclined channel, a mandrel within said sleeve device, said mandrel having a channel inclined in the opposite direction from the first mentioned channel, said dies engaging in said inclined channels and moving along them during the cutting, and said dies being radially moved upon relative axial movement of said retaining device and said sleeve device and mandrel.

In testimony whereof I have signed my name to this specification.

WILHELM BIRTEL.